Feb. 16, 1932. C. SKOGSBERG 1,845,851
COMBINED LEVELER AND RIDGER
Filed Oct. 15, 1930 3 Sheets-Sheet 1

Clarence Skogsberg
INVENTOR
BY Victor J. Evans
ATTORNEY

Feb. 16, 1932. C. SKOGSBERG 1,845,851
COMBINED LEVELER AND RIDGER
Filed Oct. 15, 1930 3 Sheets-Sheet 2
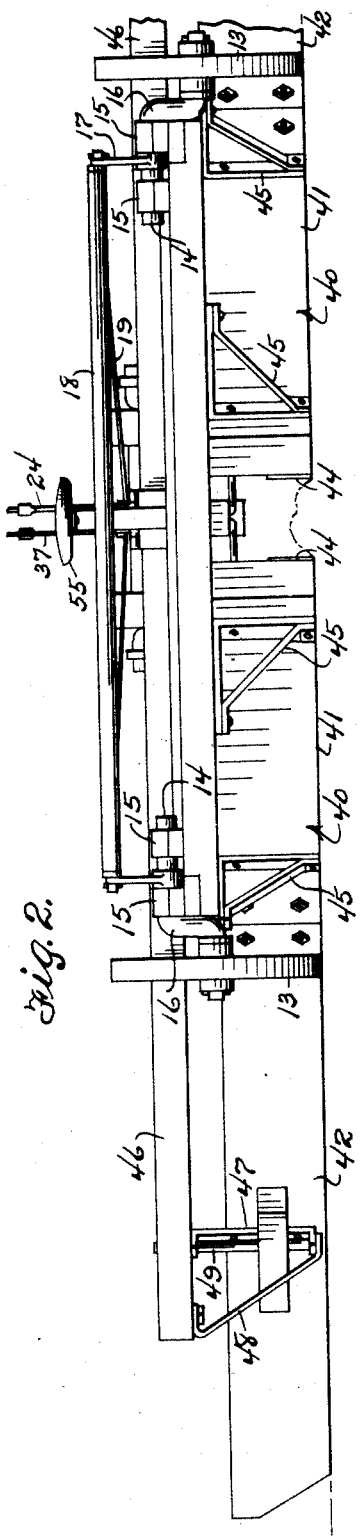
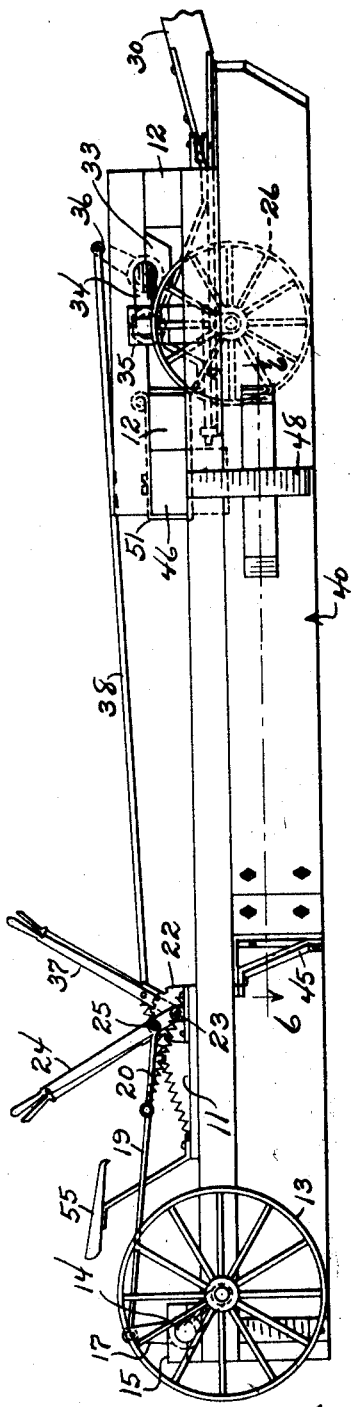
Clarence Skogsberg INVENTOR
BY Victor J. Evans
ATTORNEY Feb. 16, 1932.  C. SKOGSBERG  1,845,851
COMBINED LEVELER AND RIDGER
Filed Oct. 15, 1930  3 Sheets-Sheet 3
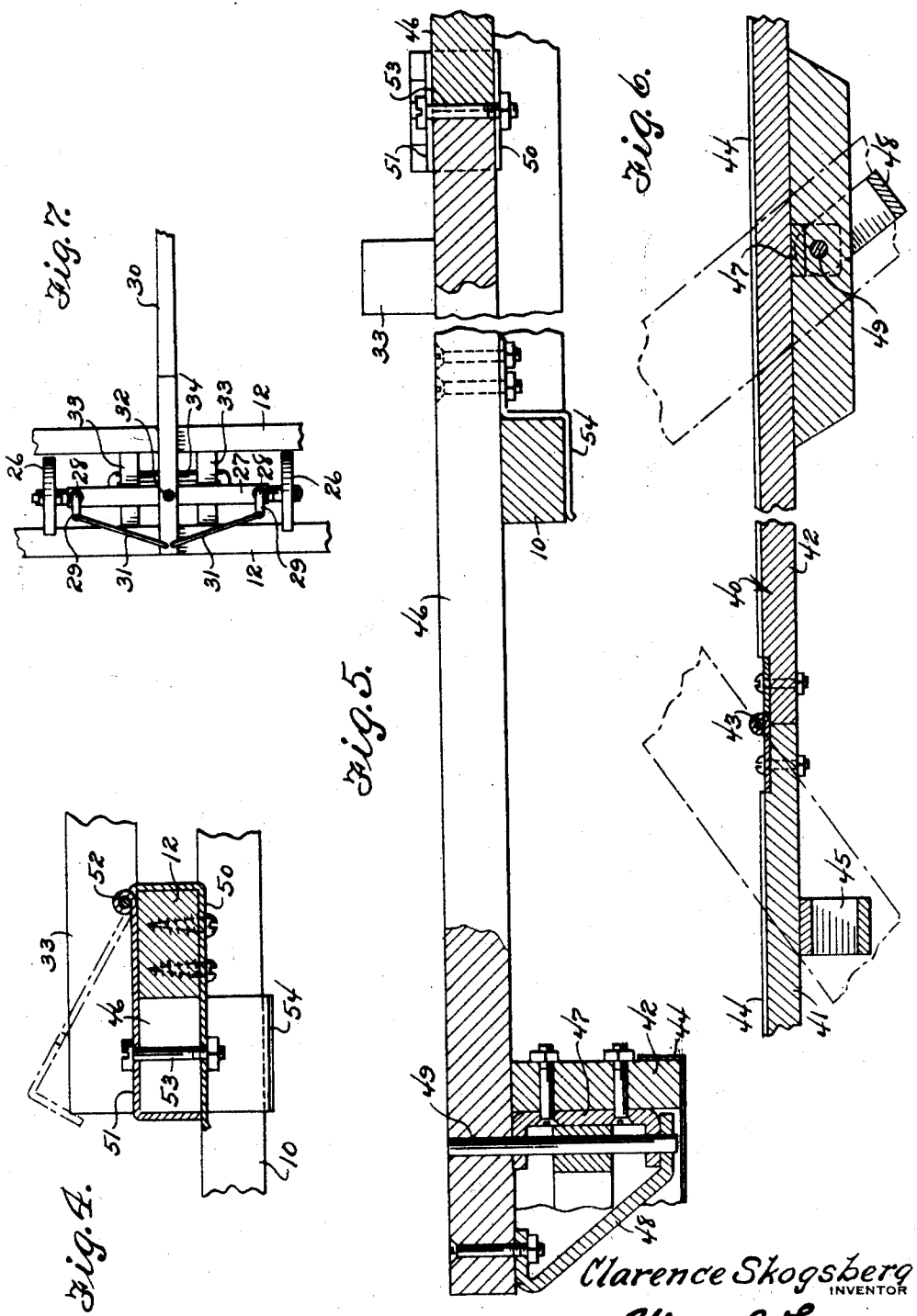

Patented Feb. 16, 1932

1,845,851

UNITED STATES PATENT OFFICE

CLARENCE SKOGSBERG, OF NAMPA, IDAHO

COMBINED LEVELER AND RIDGER

Application filed October 15, 1930. Serial No. 488,966.

This invention relates to leveling machines especially adapted for use on irrigated land, an object being to provide a machine which, in addition to leveling the ground, will at the same time throw up a ridge or border, and thus decrease the cost of the work by simultaneously performing both the leveling and ridging operations.

Another object of the invention is the provision of a machine of the above character which may be used for leveling only, and which may be adjusted to suit the particular character of the work to be done.

Another object of the invention is the provision of a machine, which, in addition to the above and other advantageous features is simple in construction and efficient and reliable in use.

With the above and other objects in view, the invention further includes the following novel features and details of construction, to be hereinafter more fully described, illustrated in the accompanying drawings and pointed out in the appended claims.

In the drawings:

Figure 2 is a rear elevation.

Figure 3 is a side view.

Figure 1:
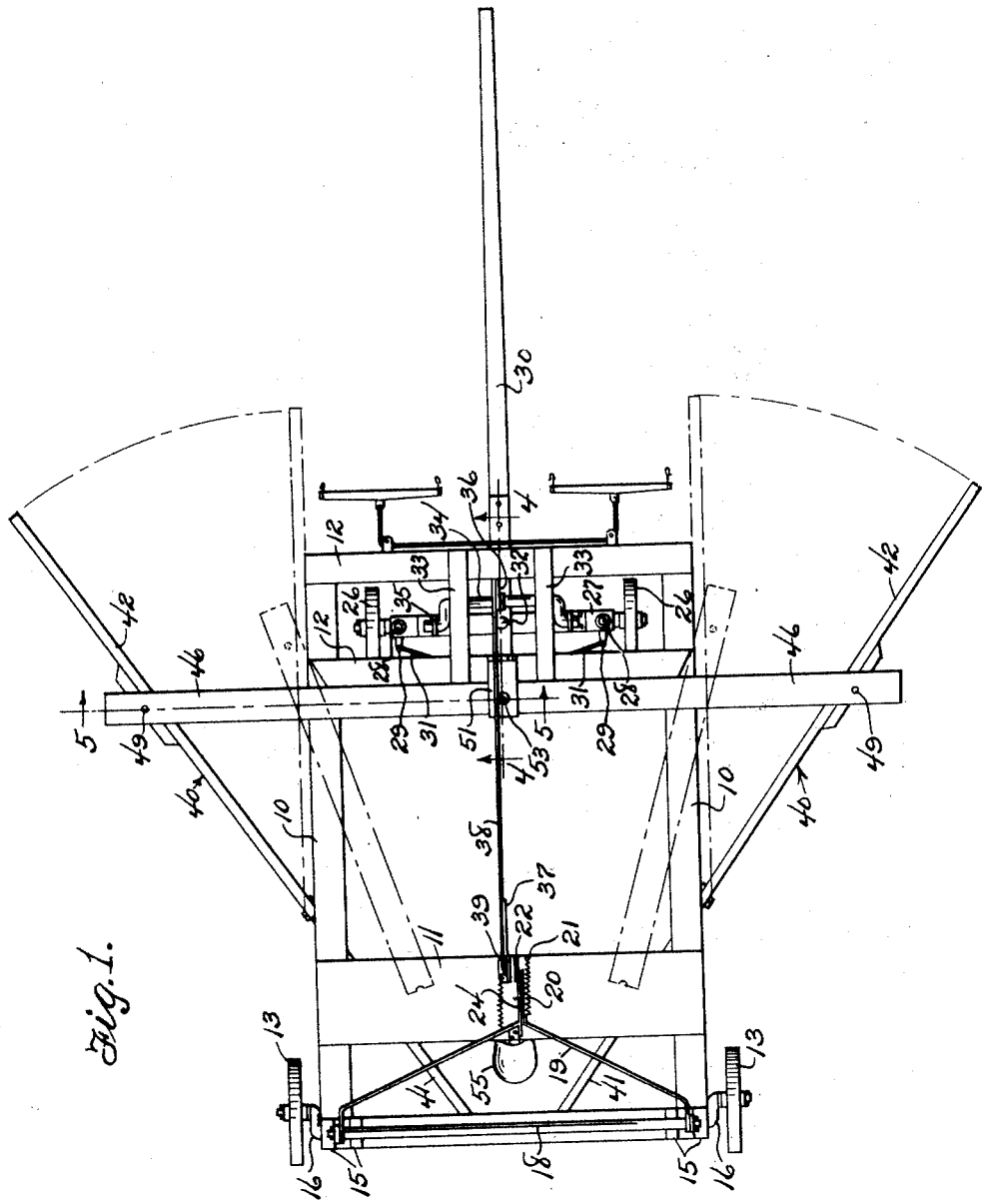
Figure 1 is a top plan view of a combined leveling and ridging machine constructed in accordance with the invention.

Figures 4 and 5 are sectional views taken respectively on the lines 4—4 and 5—5 of Figure 1.

Figure 6 is a section on the line 6—6 of Figure 3.

Figure 7 is a detail bottom plan view showing the steering mechanism.

Referring to the drawings in detail wherein like characters of reference denote corresponding parts, the machine as shown comprises a frame which includes parallel side bars 10 and cross bars 11 and 12, the latter being arranged relatively close and in parallel relation at the front end of the frame.

The rear end of the frame is supported by wheels 13, and these wheels are mounted upon the outer ends of axles 14 which are mounted for rocking movement in bearings 15 carried by the frame. The axles 14 are short and are provided with crank portions 16 upon the outer ends of which the wheels 13 are mounted. By rocking the axles 14, the height of the frame may be adjusted with respect to the wheels.

Rigid with each of the axles 14 is an arm 17, and these arms are connected by a bar 18. Also connected with these arms is a yoke 19, to which is connected one end of a spring 20. The opposite end of this spring is secured to the frame by any desired means and at a point indicated at 21. The tendency of the spring 20 is to pull the arms 17 forward and in an upright position.

Secured upon a cross bar 11 is a toothed segment 22, and pivotally mounted adjacent the segment as shown at 23 is a lever 24. This lever carries the upper actuated latch which engages the toothed segment 22 and has a pivotal connection 25 with the yoke 19. By adjusting the lever 24, the axles 14 may be rocked with the adjustment of the rear end of the frame, as previously mentioned.

The forward end of the frame is supported upon wheels 26, and these wheels are connected to a bolster 27 by means of a steering knuckle 28, the latter having a steering arm 29 extending therefrom. The arms 29 are connected to the rear end of a draft tongue 30 by means of rods 31, and this tongue is pivotally secured to the bolster as shown at 32. By moving the tongue pivotally, the wheels 26 will be simultaneously moved to control the direction of travel of the machine.

Rockably mounted in bearing bars 33 which connect the cross bars 12, is a crank axle 34, and the outer ends of this axle are pivotally mounted as at 35 upon the bolster 27. Extending from the axle 34 and rigidly connected thereto is an arm 36, which is connected to an adjusting lever 37 through the medium of the rod 38. This lever is pivotally mounted upon the cross bar 11 and carries a spring dog which engages the teeth of a segment 39, also mounted upon the bar 11. Thus, by means of the lever 37, the front axle 34 may be rocked to adjust the height of the front end of the frame.

Positioned upon opposite sides of the frame are scraper blades 40. These blades each comprise a relatively stationary section 41 and an adjustable section 42, the latter being hingedly secured to the stationary section as shown at 43. The blades may be of any suitable material and are preferably provided with metal scraping elements 44. The blades 40 incline forwardly and outwardly, their rear ends being spaced a slight distance apart to provide for the passage of dirt, so that in the operation of the machine, dirt scraped from the surface will be moved inward towards the center of the machine to form a ridge or border at the same time that the leveling operation is performed.

The machine may also be used for leveling only, and for this operation, adjustments are made so that only a small quantity of dirt is carried inward for passage through the opening between the rear ends of the blades. This leaves only a small ridge at the first operation, and upon the second operation, the extreme end of the outer blade will catch this ridge and distribute it over the surface so as to leave a uniform surface as the work progresses.

The rigid sections 41 of the blades are secured to the side bars 10 of the frame by means of brackets 45, while the adjustable sections have pivotally secured thereto beams 46. For this purpose, the blade sections 42 carry bearing brackets 47, and the beams 46 carry brackets 48. Pins 49 extend through the beams and through the brackets 47 and 48, so that a pivotal connection between the beams and the sections 42 of the blades is provided. The free ends of the beams 46 are removably secured to the frame, and for this purpose, one of the cross bars 12 carries a clamp. This clamp includes a rigid member 50 which is secured to the bar 12, and movable member 51 which is hingedly secured to the member 50 as shown at 52. The members 50 and 51 are substantially L-shaped and are reversely arranged, so that the bar 12 occupies a position at one end of the clamp, while the ends of the beams 46 may occupy a position at the opposite end of the clamp, as shown in Figure 4 of the drawing. The hinged member 51 of the clamp is held in clamped position by means of a bolt 53. In addition, the beams 46 have secured thereto substantially Z-shaped members 54, which are adapted to engage the side bars 10 of the frame when the blades are extended, as in Figure 1 of the drawings. This engagement of the members 54 with the bars 10 is illustrated in Figure 5.

By disconnecting the beams 46 from the clamp and from the frame, the sections 42 of the blades may be swung inward as shown by the dotted lines in Figure 1, so that the width of the machine may be reduced for passage through gates and other restricted places.

The machine is provided with a seat 55, for the operator.

The invention is susceptible of various changes in its form, proportions and minor details of construction and the right is herein reserved to make such changes as properly fall within the scope of the appended claims.

Having described the invention what is claimed is:—

1. In a combined leveling and ridging machine, a frame, front and rear supporting wheels, sectional scraper blades located at opposite sides of the frame, each of said blades comprising a rigid frame carried section and an adjustable section hingedly secured thereto, beams having their outer ends pivotally secured to the hinged sections of the blades, a frame carried clamp removably engaged with the inner ends of the beams to hold the blades extended, means carried by the beams to detachably engage the frame and stabilize the beams, and means to adjust the height of the scraper blades.

2. In a combined leveling and ridging machine, a frame, front and rear supporting wheels, sectional scraper blades located at opposite sides of the frame, each of said blades comprising a rigid frame carried section and an adjustable section hingedly secured thereto, beams having their outer ends pivotally secured to the hinged sections of the blades, means carried by the beams to detachably engage the frame and stabilize the beams, and means to adjust the height of the scraper blade.

In testimony whereof I affix my signature.

CLARENCE SKOGSBERG.